US00RE44016E

(19) United States
(12) Reissued Patent
Remmers

(10) Patent Number: US RE44,016 E
(45) Date of Reissued Patent: Feb. 19, 2013

(54) WALL ANCHOR

(75) Inventor: Lee E. Remmers, Ocala, FL (US)

(73) Assignee: Clairson, Inc., Newark, DE (US)

(21) Appl. No.: 11/014,663

(22) Filed: Dec. 16, 2004

Related U.S. Patent Documents

Reissue of:
(64) Patent No.: 6,494,653
Issued: Dec. 17, 2002
Appl. No.: 09/835,967
Filed: Apr. 17, 2001

(51) Int. Cl.
*F16B 21/00* (2006.01)

(52) U.S. Cl. ..... 411/344; 411/44; 411/45; 411/57.1; 411/62; 411/63; 411/80.5; 411/340

(58) Field of Classification Search ..... 411/344, 411/44, 57.1, 62, 63, 80.5, 80.6
See application file for complete search history.

(56) References Cited

U.S. PATENT DOCUMENTS

| | | | | |
|---|---|---|---|---|
| D48,258 | S | 12/1915 | Pleister | |
| D48,259 | S | 12/1915 | Pleister | |
| D48,260 | S | 12/1915 | Pleister | |
| D48,261 | S | 12/1915 | Pleister | |
| D48,262 | S | 12/1915 | Pleister | |
| D48,263 | S | 12/1915 | Pleister | |
| D48,264 | S | 12/1915 | Pleister | |
| 2,033,100 | A | 3/1936 | Kellogg | |
| 2,555,420 | A | 6/1951 | Richardson | |
| 3,188,905 | A | 6/1965 | Millet | |
| 3,413,887 | A * | 12/1968 | Von Wolff et al. | 411/62 |
| 3,650,173 | A | 3/1972 | Mathe | |
| 4,181,061 | A | 1/1980 | McSherry | |
| 4,210,057 | A * | 7/1980 | Goring et al. | 411/37 |
| 4,221,154 | A | 9/1980 | McSherry | |
| 4,264,047 | A | 4/1981 | Nelson | |
| 4,274,324 | A | 6/1981 | Giannuzzi | |
| 4,312,614 | A | 1/1982 | Palmer et al. | |

(Continued)

FOREIGN PATENT DOCUMENTS

| | | | | |
|---|---|---|---|---|
| DE | 2847595 | * | 5/1980 | 411/62 |
| GB | 1000131 | | 8/1965 | |

OTHER PUBLICATIONS

Toggler® Anchor System Product Catalog, www.toggler.com, 6 pages.

(Continued)

*Primary Examiner* — Roberta Delisle
(74) *Attorney, Agent, or Firm* — Harness, Dickey & Pierce, P.L.C.

(57) ABSTRACT

The present invention is a wall anchor having a novel finger configuration. This wall anchor has a head and barrel portion with a bore extending therethrough and laterally expandable fingers in general alignment with the bore. Instead of a straight channel, a channel having curved portions separates the fingers. The curved portions of the channel define ramp surfaces that at least partially extend into the path of a securing member created by the bore. Thus, when a securing member, such as a bolt, pin, screw, nail or similar object is inserted into the bore to secure the wall anchor to the wall, the securing member contacts the two ramp surfaces, separating the fingers. As the fingers separate, a portion of the fingers near the ramp surfaces deform such that the ramp surfaces rest on an outer portion of the securing member, thus providing a securing force for connecting the wall anchor to the wall and relieving stress on the area at which the fingers are connected to the barrel.

22 Claims, 5 Drawing Sheets

U.S. PATENT DOCUMENTS

| | | | | | |
|---|---|---|---|---|---|
| 4,361,099 | A | | 11/1982 | Kokenge et al. | |
| 4,518,291 | A | | 5/1985 | Lang et al. | |
| 4,548,327 | A | | 10/1985 | Kilkelly | |
| 4,571,134 | A | | 2/1986 | Beglinger et al. | |
| 4,624,376 | A | | 11/1986 | Bertram | |
| 4,637,765 | A | | 1/1987 | Omata | |
| 4,646,998 | A | | 3/1987 | Pate | |
| 4,662,595 | A | | 5/1987 | Camilleri | |
| 4,669,936 | A | | 6/1987 | Camilleri | |
| 4,693,248 | A | | 9/1987 | Failla | |
| 4,708,552 | A | | 11/1987 | Bustos et al. | |
| 4,722,648 | A | | 2/1988 | Camilleri | |
| 4,735,325 | A | | 4/1988 | Remmers | |
| 4,752,170 | A | | 6/1988 | McSherry et al. | |
| 4,753,405 | A | | 6/1988 | Camilleri | |
| 4,757,664 | A | * | 7/1988 | Freissle | 52/509 |
| 4,861,206 | A | | 8/1989 | Riedel | |
| 4,878,790 | A | | 11/1989 | McSherry et al. | |
| D310,623 | S | | 9/1990 | Aranibar | |
| 4,993,901 | A | | 2/1991 | McSherry et al. | |
| 5,028,186 | A | | 7/1991 | McSherry | |
| D322,555 | S | | 12/1991 | Kokenge et al. | |
| 5,161,296 | A | | 11/1992 | Garfield et al. | |
| 5,195,856 | A | | 3/1993 | McSherry et al. | |
| 5,205,688 | A | | 4/1993 | Sundstrom | |
| 5,224,805 | A | * | 7/1993 | Moretti et al. | 411/30 |
| 5,246,323 | A | | 9/1993 | Vernet et al. | |
| 5,286,152 | A | | 2/1994 | Anderson | |
| 5,288,189 | A | | 2/1994 | Hepworth | |
| 5,308,203 | A | | 5/1994 | McSherry et al. | |
| 5,312,215 | A | | 5/1994 | Anquetin | |
| 5,380,135 | A | | 1/1995 | Anquetin | |
| 5,409,336 | A | | 4/1995 | Jericevich et al. | |
| 5,529,449 | A | | 6/1996 | McSherry et al. | |
| 5,533,851 | A | | 7/1996 | Remmers | |
| 5,536,121 | A | | 7/1996 | McSherry | |
| 5,540,528 | A | | 7/1996 | Schmidt et al. | |
| 5,603,593 | A | * | 2/1997 | Fischer et al. | 411/55 |
| 5,605,238 | A | | 2/1997 | Jacobs | |
| 5,704,746 | A | | 1/1998 | Leib et al. | |
| 5,752,792 | A | | 5/1998 | McSherry | |
| 5,807,050 | A | | 9/1998 | Daler et al. | |
| 5,833,415 | A | | 11/1998 | McSherry | |
| 5,938,385 | A | | 8/1999 | Garfield et al. | |
| 5,944,295 | A | | 8/1999 | McSherry | |
| 6,086,035 | A | | 7/2000 | Trifilio | |
| 6,829,871 | B1 | | 12/2004 | McSherry et al. | |
| 7,143,497 | B2 | * | 12/2006 | Panasik et al. | 29/525.05 |
| 2005/0076602 | A1 | | 4/2005 | Routhier | |

OTHER PUBLICATIONS

Office Action dated Apr. 29, 2002 for U.S. Appl. No. 09/835,967 (7 pages).

English Transation of Abstract for DE 28 47 595 (1 page).

* cited by examiner

WALL ANCHOR

Matter enclosed in heavy brackets [ ] appears in the original patent but forms no part of this reissue specification; matter printed in italics indicates the additions made by reissue.

BACKGROUND OF THE INVENTION

In walls formed of plaster boards, sheet rock, plywood and other relatively thin or soft materials, problems can arise when attempting to mount objects to these walls, particularly transverse rods for draperies, drapes, lighting fixtures, picture frames and other objects which impose stress upon these walls. These walls can be incapable of receiving the aforementioned rods, fixtures and frames when held in place by standard screws and bolts. Thus, it has become common practice to use anchoring sockets of some sort in order to secure these objects to a wall. A number of wall anchors are noted in the prior art, particularly U.S. Pat. Nos. 4,646,998; 4,752,170; 5,409,339; 5,533,851; and 6,086,035.

Prior art wall anchors, or back clips as they are otherwise known, such as disclosed in U.S. Pat. No. 4,669,936, teach a back clip having a body portion with a hollow barrel therein and laterally expandable fingers in alignment with the hollow barrel. The fingers extend through a wall and upon receiving a bolt, pin, screw or other securing member through the barrel, the laterally expandable fingers expand against the inside portion of the wall.

Common wall anchors, such as the one taught by U.S. Pat. No. 4,669,936, have a straight channel separating the fingers. This channel is usually narrower than the hollow barrel portion, so that when the securing member is inserted, it expands the fingers, securing the wall anchor to the wall. When these fingers are expanded they necessarily bend or hinge at some point on the finger, usually at a point at or near where each finger is connected to the hollow barrel. This hinge portion of the fingers is thus normally under some amount of stress due to the deformation that takes place in the wall anchor when the bolt, pin or screw is introduced into the wall anchor. Because of this stress, harder, more rigid plastics, the most preferred material of construction for wall anchors, tend to break in this hinge area, particularly when used in cold-weather. Softer plastics are commonly used to avoid this breakage problem, but may correspondingly reduce the strength of the wall anchor.

Referring to FIG. 1, a prior art wall anchor 2 is shown. Wall anchor 2 of FIG. 1 includes a generally flat circular head 4 having a bore therethrough (not shown) for receiving a securing member, such as a bolt, pin, screw, nail or similar object (not shown). Wall anchor 2 also contains a barrel 6 having a bore therethrough (not shown) and a pair of symmetrical fingers 8a and 8b flexibly joined to the barrel 14 at its back end. A generally straight channel 10 separates the two symmetrical fingers 8a and 8b. FIG. 2A shows a view of the prior art wall anchor from the front, and, looking through the bore in head 4, channel 10 is visible between the two symmetrical fingers 8a and 8b.

FIG. 2B shows the prior art wall anchor 2 in its secured position in a wall 16. The bores through the barrel 6 and the head 4 receive a securing member, in this case a mounting pin 14, therethrough. When the mounting pin 14 is inserted into the wall anchor, the pin engages and spreads the fingers 8a and 8b apart. The portions 12a and 12b, where the fingers 8a and 8b attach to the barrel 6, are under a considerable amount of stress due to the deformation that takes place when the fingers are expanded.

It would thus be desirable to develop a wall anchor designed to reduce stress in the hinge portion of the fingers. This type of wall anchor would allow for the use of harder, more rigid plastics, resulting in a stronger anchor less susceptible to breakage.

SUMMARY OF THE INVENTION

A wall anchor has a body portion having a hollow barrel and laterally expandable fingers in general alignment with the hollow barrel. Instead of using a straight channel separating two symmetrical fingers, as is commonly used in prior art wall anchors, an asymmetrical channel is used to provide at least two ramp surfaces, one on each of a plurality of asymmetrical fingers, i.e. none of the fingers are the same shape. The ramp surfaces face the path created by the hollow portion of the barrel. Thus, when a securing member, such as a bolt, pin, screw, nail or other similar object, is inserted into the hollow barrel to secure the wall anchor to the wall, the securing member contacts the two ramp surfaces. As the securing member is pushed through the hollow barrel and into the curved channel, it separates the fingers. As the fingers separate, the ramp surfaces deform under the pressure exerted by the securing member, and then rest on an outer portion of the securing member.

This design thus allows for a redistribution of the stress from a hinge portion of the anchor to the ramp surfaces of the fingers when the fingers are separated. This allows the wall anchor to be manufactured from harder, more rigid materials, thereby improving the strength of the wall anchor and reducing its susceptibility to breaking.

DESCRIPTION OF ILLUSTRATIVE EMBODIMENTS

Figure 2B:
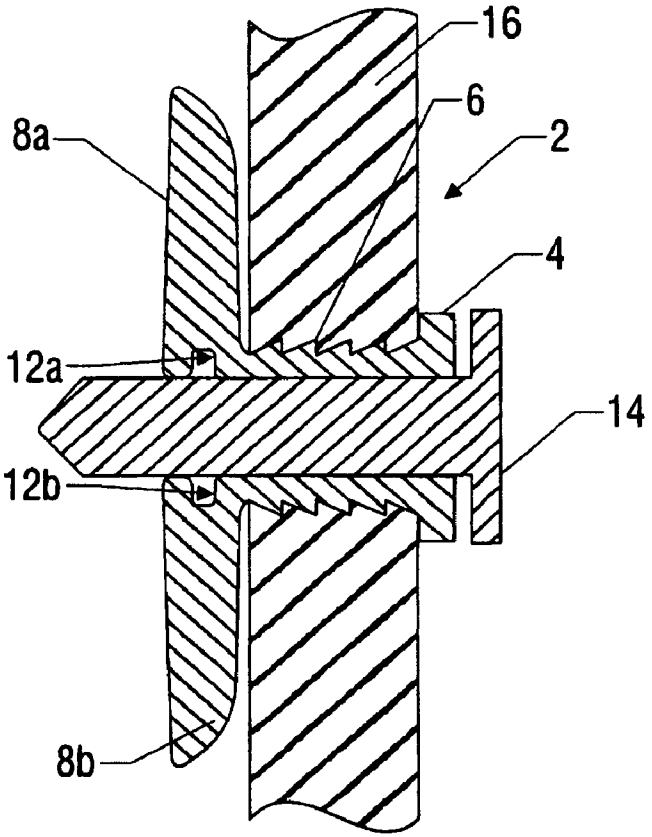
FIG. 2B (Prior Art)
FIG. 2B is a side, cross-sectional view of the prior art anchor secured in a wall with its fingers expanded.
Figure 1:
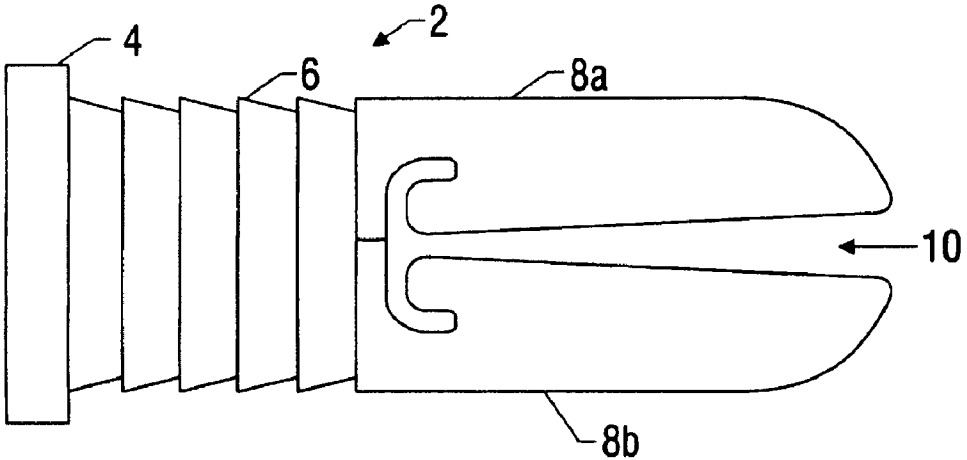
FIG. 1 (Prior Art)
FIG. 1 is a side view of a prior art wall anchor.
Figure 2A:
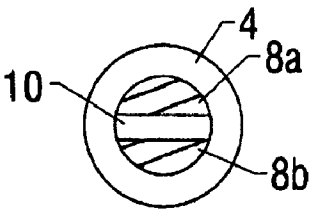
FIG. 2A (Prior Art)
FIG. 2A is a front view of a prior art wall anchor.
Figure 3:
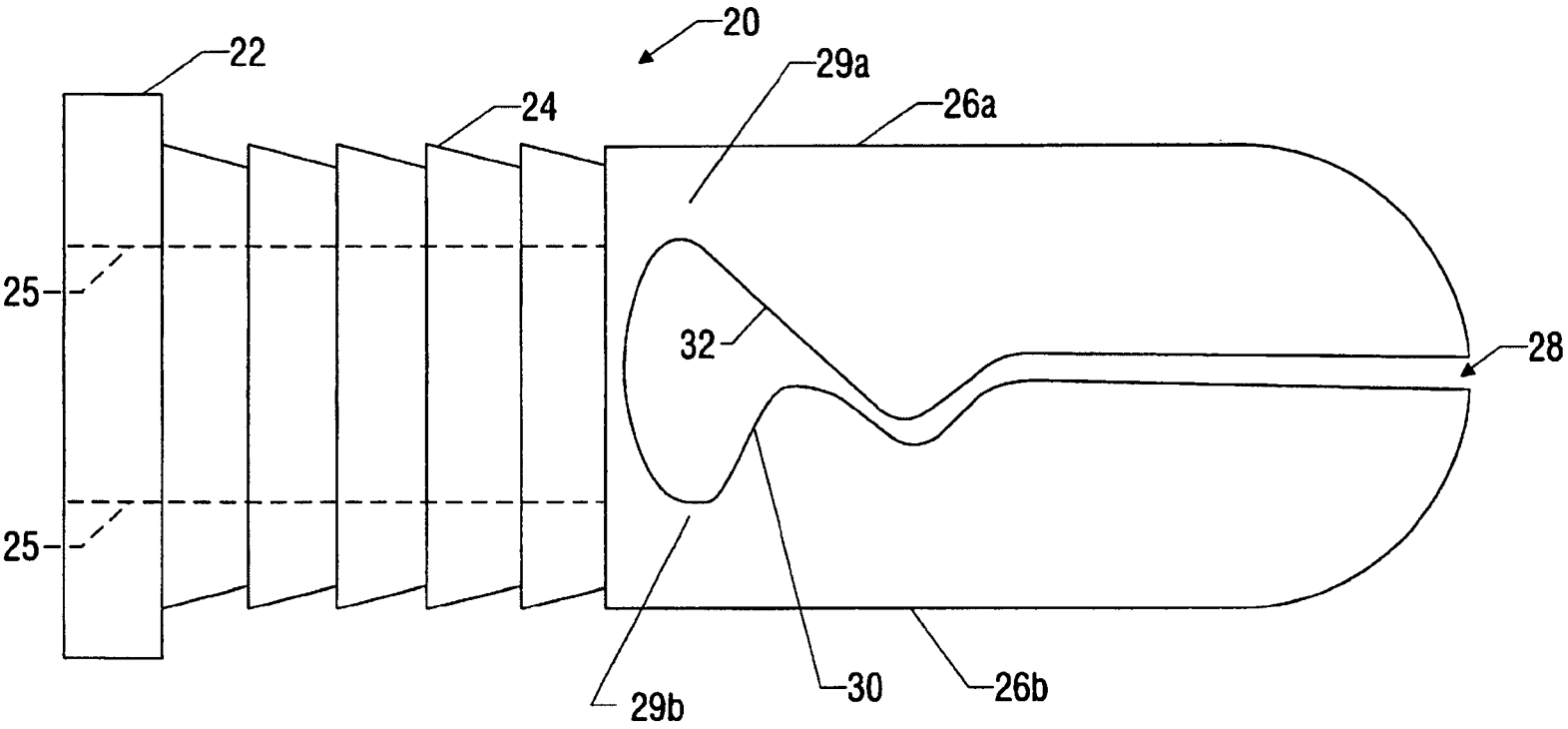
FIG. 3 is a side view of one embodiment of the present invention.

FIG. 3 displays one embodiment of the novel wall anchor 20 of the present invention. Wall anchor 20 of the illustrated embodiment of the present invention includes a head 22 preferably having a bore [23] *25* therethrough (shown in FIG. [4] *3*) for receiving a securing member (not shown) such as a bolt, pin, screw, nail or similar object. The bore can be of any acceptable shape to receive a securing member, but is preferably at least partially circular. In one example, the bore can have a flattened portion so as to better secure the securing member, as described in U.S. Pat. No. 5,553,851. The head can also be of any configuration, including having a hook or other member integrally formed or attached thereto in order to hang an item (for example a wire shelf) to a wall.

Wall anchor 20 also contains a barrel 24 having a bore therethrough (shown with the bore defined by dashed lines 25) and a plurality of preferably resilient fingers, here shown in a preferred embodiment of two asymmetrical fingers 26a and 26b. The barrel 24 is attached at one end to the head 22, and the fingers are flexibly joined to the barrel 24 at the barrel's other end. The diameter of the bore through barrel 24 is preferably substantially the same size as the bore in the circular head 22. The barrel 24 is also preferably notched, as shown, so that the notches can cut into or otherwise engage the wall material when the wall anchor 20 is being pulled from the wall, so as to prevent slippage.

Figure 4:
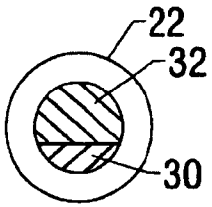
FIG. 4 is a front view of one embodiment of the present invention.

Channel 28 separates the asymmetrical fingers 26a and 26b. Unlike known wall anchors, a portion of channel 28 does not run down the centerline between the fingers. Instead, a portion of channel 28 provides ramp faces 30 and 32 that face the bore of barrel 24 and extend at least partially into the path created by the bore. This novel design allows for easier installation of a securing member in that after a securing member is passed through the bores of the head 22 and the barrel 24, it contacts the ramps, thereby expanding the fingers. Viewing the wall anchor from the front and looking through the bore 25, as in FIG. 4, it can be seen how ramp faces 30 and 32 extend into the path created by the bore 25. Channel 28 is not visible between the fingers 26a and 26b, because in combination the ramp faces 30 and 32 on the two fingers cover the path created by the bore 25.

Figure 5:
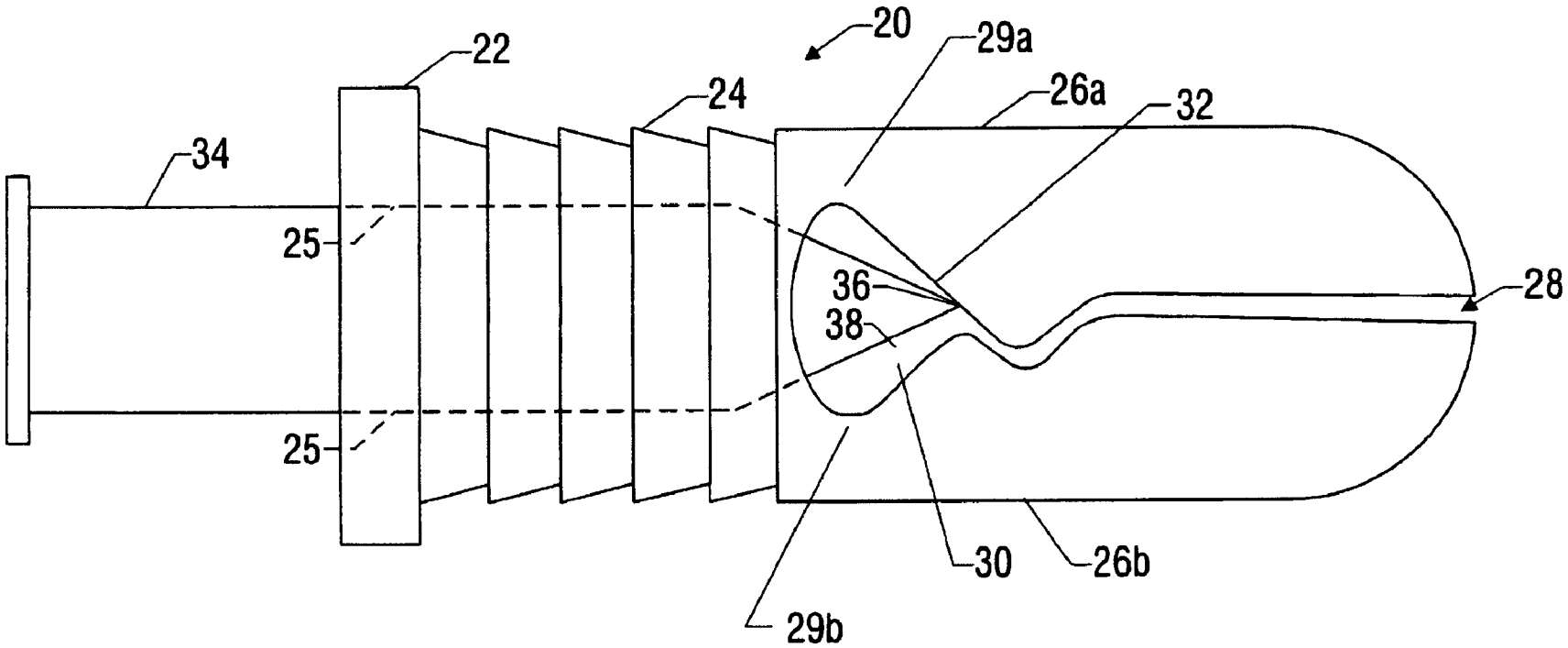
FIG. 5 is a view of one embodiment of the present invention as a securing member interacts with the ramp surfaces of the present invention.

In the embodiment shown in FIG. 5, the securing member first contacts one ramp and begins expanding its respective finger, and then contacts the other ramp, expanding its respective finger. By beginning the expansion of one finger at a time in the preferred embodiment, the securing member is made easier to push or screw into the wall anchor 20. Furthermore, the ramps are preferably made out of a deformable material, such as plastic, such that after being engaged by the securing member, the ramps 30 and 32 on fingers 26b and 26a respectively, can deform and flatten out, ending up in continuous contact with the shaft of the securing member.

Figure 6:
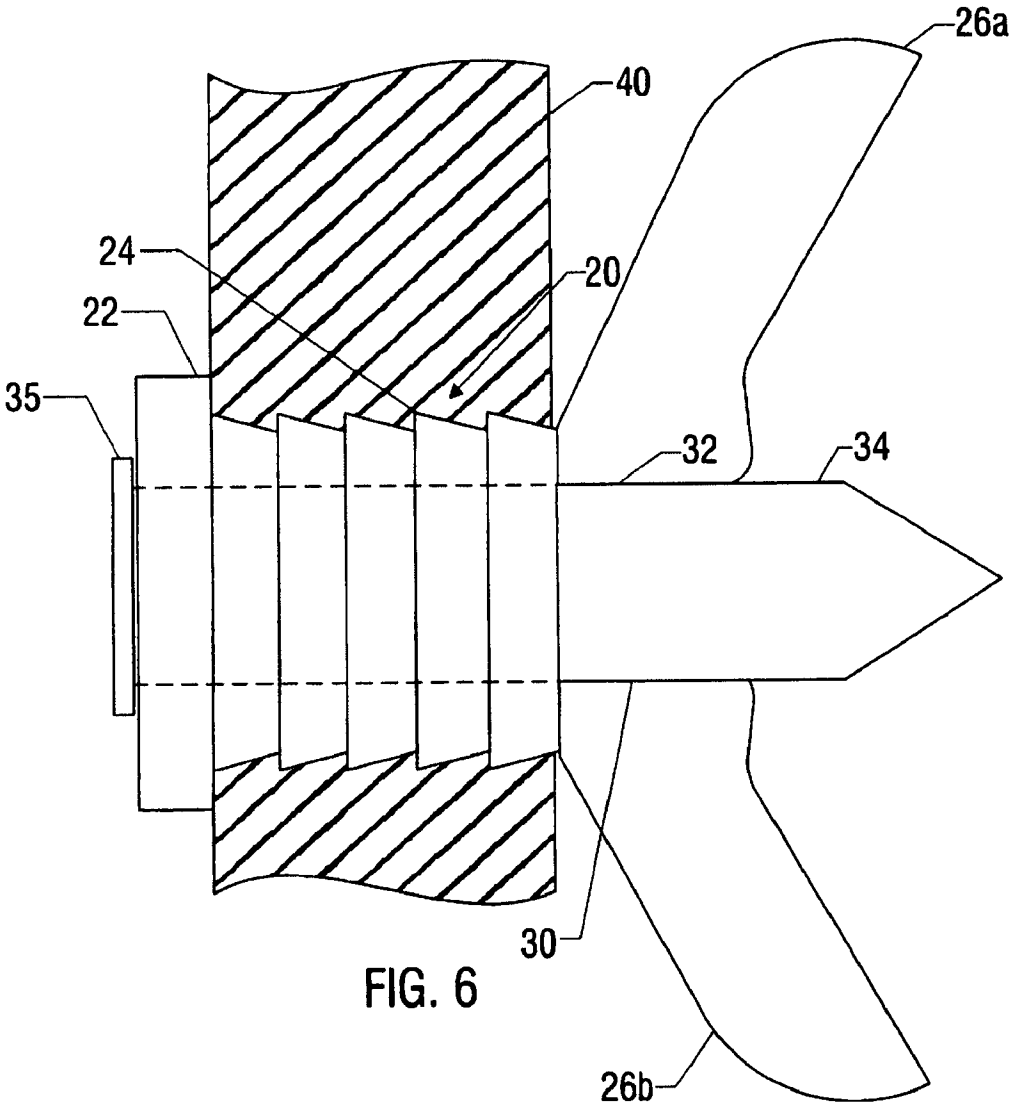
FIG. 6 is a view of one embodiment of the present invention with its fingers expanded.

The extent of such deformation will likely depend on the thickness of the wall or other support to which it is attached. If the fingers are completely free from the wall (as shown in FIG. 6) less deformation will take place than if all or a portion of the fingers was positioned inside of the thickness of the wall. This deformation of the ramps redistributes some of the stress loading on the anchor from the hinge areas 29a and 29b where the fingers 26a and 26b connect to the barrel 14, to the ramp faces 30 and 32 that are in contact with the securing member. This helps to reduce the wall anchor's chances of breaking at the hinge area, allowing for the use of stronger, more rigid plastics, and thus increasing the strength and the life of the wall anchor.

FIG. 5 shows an example of the engagement of a securing member 34, in this case shown as a pin, with the ramp faces 30 and 32 just prior to the expansion of the fingers 26a and 26b. In the embodiment of FIG. 5, when the securing member 34 is inserted into the bore, point 36 engages flat ramp face 32. As the securing member 34 proceeds forward, finger 26a is expanded and is forced upwardly. As the securing member 34 continues forward, taper 38 will contact ramp 30, and finger 26b will expand and be forced downward. Of course, the ramps can be configured in any manner such that deformation of the ramps occurs, thereby reducing stress on the hinge portion.

FIG. 6 illustrates the securing member 34 completely inserted into an embodiment of the wall anchor 20 as shown in narrow wall 40. The securing member 35 is pushed forward until a head 35 of the securing member 34, which preferably has a larger diameter than the bore through the head 22 of the wall anchor 20, contacts head 22 of the wall anchor 20. After being expanded, the ramps 30 and 32 on fingers 26b and 26a, respectively, deform (slightly, in the embodiment shown), ending up in continuous contact with the shaft of the securing member 34. Expanded fingers 26a and 26b thus secure the wall anchor 20 to the wall 40. As discussed above, wall anchor 20 can also be similarly mounted in walls that are thicker than the barrel 24. The ramps 30 and 32 of FIG. 6, however, would be more deformed by the securing member 34 and could even 'flatten' to the sides of the fingers, thus creating a securing force on the inside of the wall 40.

The wall anchors of the present invention are preferably of unitary construction and made of a suitable resilient plastic or polymer material, such as polypropylene. ABS is the most preferred plastic material of construction. ABS is stronger, stiffer and tougher than high impact polystyrene and is also superior to it in its resistance to high temperatures and chemicals. This stronger, stiffer, tougher nature of ABS makes it desirable to improve the strength characteristics of the wall anchor. Stiffer plastics can have tendency to break when under stress, particularly in colder climates. The novel design of the present invention, however, redistributes the stresses away from the hinge areas where the fingers connect to the barrel. Thus, harder, stiffer ABS can be used without the worry that the wall anchor will break at the hinge area.

The use of harder, stiffer plastics also allows the wall anchor to be designed so as to screw itself into a wall or other support structure. Commonly, a hole is first drilled into the support structure of relatively the same or slightly smaller diameter of the barrel of the wall anchor. The wall anchor is inserted therein, and then the securing member inserted into the wall anchor to secure it to the support structure. In contrast, in one embodiment of the present invention the wall anchor can be designed with a self drilling point to cut its own hole.

Figure 7:
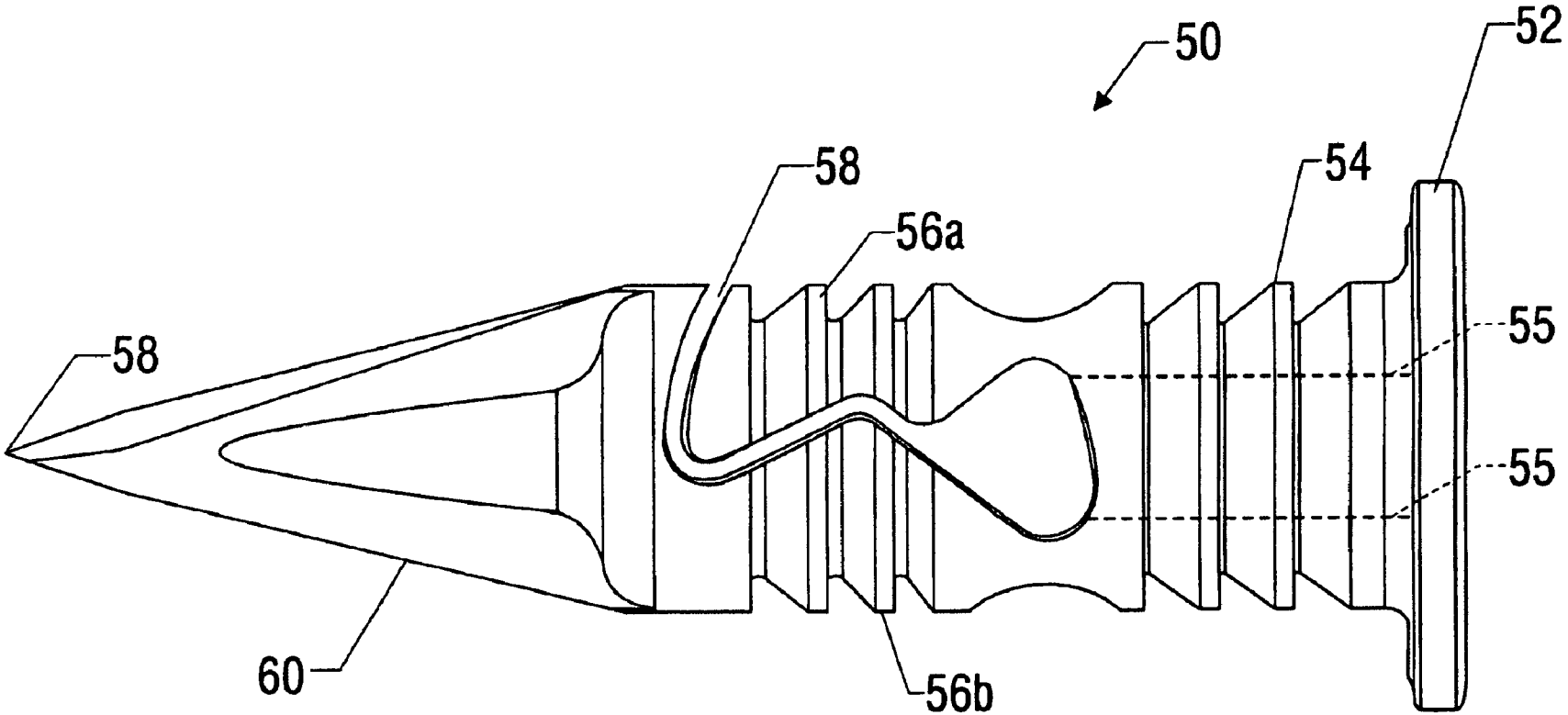
FIG. 7 is a side view of an embodiment of the present invention having a self-drilling feature.

Referring now to FIG. 7, another embodiment of the current invention, wall anchor 50, is shown with head 52 and barrel 54, each having bore therethrough (shown by dashed lines 55) for receiving a securing member (not shown). Wall anchor 50 also contains a plurality (preferably a pair) of fingers 56a and 56b flexibly joined to the barrel 54. The diameter of the bore through barrel 54 is substantially the same size as the bore in the head 52.

Channel 58 separates fingers 56a and 56b much like the embodiment of the wall anchor shown in FIG. 3. In this embodiment, though, the channel divides the fingers 56a and 56b so that one finger, finger 56b as shown, can have a screw tip 60 attached to it. Screw tip 60 has a self-drilling point 58 that cuts its own hole in the wall or support member. Head 52 of wall anchor 50 may have a means for receiving a screwdriver therein for screwing the self-drilling wall anchor 50 into a wall or support member. For example, head 52 can have slots therein for insertion of the tip of a screwdriver. Wall anchor 50 can also be configured to be driven into a wall with a hammer, mallet or similar device.

The wall anchors of the present invention are preferably manufactured as a single piece with all the features incorporated therein. The wall anchor of the present invention can also be attached to or manufactured as a single piece with a functional unit of some sort. For instance, U.S. Pat. No. 4,735,325 discloses a support clip requiring a means for attachment to a support structure. The wall anchor of the present invention can be used as those means, and could be made in unitary construction with the support clip. Generally, functional units in need of a wall anchor of the present invention will be hooks, clips, rings, support structures such as shelving, and other apparatuses that are attached to a wall or other support structure.

While the structures of the present invention have been described in terms of preferred embodiments, it will be apparent to those of skill in the art that variations may be applied to what has been described herein without departing from the concept and scope of the invention. All such similar substitutes and modifications apparent to those skilled in the art are deemed to be within the scope and concept of the invention as it is set out in the following claims.

What is claimed is:

[1. A wall anchor comprising:

a barrel having a bore extending longitudinally therethrough and a plurality of fingers, at least 2 of which are asymmetrical, said fingers attached to the barrel;

wherein a non-linear channel separates the fingers, the channel defining resiliently-deformable ramp surfaces on the fingers, each ramp surface facing the bore of the barrel and at least partially extending into the path created by said bore;

wherein when a securing member is inserted into the bore, the securing member contacts the ramp faces so as to provide spreading force to the fingers, after which the ramp faces remain in contact with the securing member; and wherein at least one finger further comprises a self-drilling portion so that the wall anchor can be inserted into a wall or support member without pre-drilling a hole into said wall or support member.]

[2. The wall anchor of claim 1 wherein the self-drilling portion of the one finger comprises a screw tip.]

[3. The wall anchor of claim 1 further comprising a head having a bore extending longitudinally therethrough that is aligned with the bore of the barrel.]

[4. The wall anchor of claim 3 wherein the head comprises a means for engaging a screwdriver.]

[5. The wall anchor of claim 1 further comprising a securing member able to be inserted into the bore.]

[6. The wall anchor of claim 1 wherein the barrel is notched.]

[7. The wall anchor of claim 1 wherein the internal bore is at least partially circular in cross-section.]

[8. The wall anchor of claim 1 wherein the wall anchor is of unitary construction.]

[9. The wall anchor of claim 1 wherein the wall anchor is made of a resilient plastic material.]

[10. The wall anchor of claim 9 wherein the wall anchor is made of ABS plastic.]

[11. The wall anchor of claim 7 wherein the bore has a flattened portion on one side.]

*12. A wall anchor barrel, adapted to be inserted into an opening in a wall and expanded with a securing member, the barrel having a longitudinal passageway extending partly therethrough, the barrel including a plurality of hinged asymmetrical fingers separated by a non-linear channel having an enlarged proximal end portion adjacent hinge portions of the fingers, at least two of the fingers having a ramp surface generally facing the passageway, the non-linear channel also including a distal end portion adjacent ends of the fingers, and a medial portion immediately adjacent the ramp surfaces between and spaced apart from the distal end portion and the enlarged proximal end portion such that the ramp surfaces are between the medial portion and the enlarged proximal end portion, each of the distal end portion and the medial portion being smaller than the enlarged proximal end portion, the enlarged proximal end portion and distal end portion being respectively located proximally and distally relative to the ramp surfaces on different sides thereof, the enlarged proximal end being located between the ramp surfaces and the longitudinal passageway and being at least as large as or larger than the longitudinal passageway; wherein the ramp surfaces are oriented so that an end of the securing member inserted through the passageway passes one of the ramp surfaces and engages the other one of the ramp surfaces.*

*13. The wall anchor barrel of claim 12 wherein the ramp surfaces on the fingers are staggered in distance from an end of the passageway.*

*14. The wall anchor barrel of claim 12 wherein the enlarged proximal end portion is configured so as to increase flexibility of the hinge portions of the fingers.*

*15. The wall anchor barrel of claim 12 wherein the ramp surfaces are resiliently deformable.*

*16. The wall anchor barrel of claim 12 wherein the hinge portions of the fingers cooperate to define the enlarged proximal end portion of the non-linear channel therebetween.*

*17. The wall anchor barrel of claim 12 wherein the barrel is configured such that the securing member inserted through the passageway contacts the ramp surfaces to provide a spreading force to the fingers after which the ramp surfaces remain in contact with the securing member.*

*18. The wall anchor barrel of claim 12 wherein the ramp surfaces at least partially define at least a portion of the enlarged proximal end portion of the non-linear channel.*

*19. The wall anchor barrel of claim 12 wherein the angle defined between a proximal one of the ramp surfaces and a longitudinal centerline of the passageway is different than the angle defined between the distal one of the ramp surfaces and the longitudinal centerline of the passageway.*

*20. The wall anchor barrel of claim 19 wherein a proximal one of the ramp surfaces is at a steeper angle relative to the longitudinal centerline of the passageway than the distal one of the ramp surfaces.*

*21. The wall anchor barrel of claim 12 wherein the enlarged proximal end portion comprises a bulbous opening defining the ramp surfaces.*

*22. The wall anchor barrel of claim 12, wherein each of the fingers having a ramp surface is the same length.*

*23. The wall anchor barrel of claim 12, wherein at least one of the ramp surfaces extends across a longitudinal centerline of the passageway.*

*24. A wall anchor barrel, adapted to be inserted into an opening in a wall and expanded with a securing member, the barrel having a longitudinal passageway extending partly therethrough, the barrel including a plurality of hinged asymmetrical fingers separated by a non-linear channel having an enlarged proximal end portion adjacent hinge portions of the fingers, at least two of the fingers having a ramp surface generally facing the passageway, the non-linear channel also including a distal end portion adjacent ends of the fingers, and a medial portion immediately adjacent the ramp surfaces between and spaced apart from the distal end portion and the enlarged proximal end portion such that the ramp surfaces are between the medial portion and the enlarged proximal end portion, each of the distal end portion and the medial portion being smaller than the enlarged proximal end portion, the enlarged proximal end portion and distal end portion being respectively located proximally and distally relative to the ramp surfaces on different sides thereof, the enlarged proximal end being located between the ramp surfaces and the longitudinal passageway and being at least as large as or larger than the longitudinal passageway; wherein the ramp surface on a first one of the fingers projects less than half way*

*across an end of the passageway so that the securing member inserted through the passageway contacts the ramp surface on a second one of the fingers before contacting the ramp surface on the first one of the fingers.*

*25. The wall anchor barrel of claim 24 wherein the ramp surfaces are oriented so that an end of the securing member inserted through the passageway passes one of the ramp surfaces and engages the other one of the ramp surfaces.*

*26. A wall anchor barrel, adapted to be inserted into an opening in a wall and expanded with a securing member, the barrel having a longitudinal passageway extending partly therethrough, the barrel including first and second asymmetrical fingers separated by a non-linear channel, the first and second fingers including respective first and second ramp surfaces generally facing the passageway, wherein a first angle defined between the first ramp surface and a longitudinal centerline of the passageway is different than a second angle defined between the second ramp surface and the longitudinal centerline of the passageway, wherein at least one of the ramp surfaces extends across the longitudinal centerline of the passageway, wherein the non-linear channel includes an enlarged proximal end portion located between the ramp surfaces and the longitudinal passageway; wherein the first and second ramp surfaces are oriented so that an end of the securing member inserted through the passageway passes the first ramp surface and engages the second ramp surface.*

*27. The wall anchor barrel of claim 26 wherein the first ramp surface is at a steeper angle relative to the longitudinal centerline of the passageway than the second ramp surface.*

*28. The wall anchor barrel of claim 26 wherein the first and second ramp surfaces are staggered in distance from an end of the passageway.*

*29. The wall anchor barrel of claim 26 wherein the first and second ramp surfaces are resiliently deformable.*

*30. The wall anchor barrel of claim 26 wherein the non-linear channel includes a bulbous opening defining the first and second ramp surfaces.*

*31. The wall anchor barrel of claim 26 wherein the barrel is configured such that the securing member inserted through the passageway contacts the first and second ramp surfaces to provide a spreading force to the first and second fingers after which the first and second ramp surfaces remain in contact with the securing member.*

*32. A wall anchor barrel, adapted to be inserted into an opening in a wall and expanded with a securing member, the barrel having a longitudinal passageway extending partly therethrough, the barrel including first and second asymmetrical fingers separated by a non-linear channel, the first and second fingers including respective first and second ramp surfaces generally facing the passageway, wherein a first angle defined between the first ramp surface and a longitudinal centerline of the passageway is different than a second angle defined between the second ramp surface and the longitudinal centerline of the passageway, wherein at least one of the ramp surfaces extends across the longitudinal centerline of the passageway, wherein the non-linear channel includes an enlarged proximal end portion located between the ramp surfaces and the longitudinal passageway; wherein the first ramp surface projects less than half way across an end of the passageway so that the securing member inserted through the passageway contacts the second ramp surface before contacting the first ramp surface.*

*33. The wall anchor barrel of claim 32 wherein the first and second ramp surfaces are oriented so that an end of the securing member inserted through the passageway passes the first ramp surface and engages the second ramp surface.*

* * * * *